US010334775B2

(12) United States Patent
do Amaral Assy et al.

(10) Patent No.: US 10,334,775 B2
(45) Date of Patent: *Jul. 2, 2019

(54) PARTICULATE SOLID METERING AND MIXING SYSTEM FOR ROTARY SEED BROADCASTER USED FOR SOWING IN AGRICULTURAL MACHINES

(71) Applicant: Jose Roberto do Amaral Assy, Município de Caldas Novas (BR)

(72) Inventors: Jose Roberto do Amaral Assy, Município de Caldas Novas (BR); Enrico Incao, São Paulo (BR); Silvio De Lacerda, São Paulo (BR)

(73) Assignee: Jose Roberto do Amaral Assy, Caldas Novas, GO (BR)

( * ) Notice: Subject to any disclaimer, the term of this patent is extended or adjusted under 35 U.S.C. 154(b) by 0 days.

This patent is subject to a terminal disclaimer.

(21) Appl. No.: 15/692,088

(22) Filed: Aug. 31, 2017

(65) Prior Publication Data
US 2017/0359948 A1  Dec. 21, 2017

Related U.S. Application Data

(63) Continuation of application No. 14/781,731, filed as application No. PCT/BR2014/000104 on Mar. 31, 2014, now Pat. No. 9,775,282.

(30) Foreign Application Priority Data

Apr. 3, 2013 (BR) .......................... 1020130079766

(51) Int. Cl.
*A01C 1/00* (2006.01)
*A01C 1/06* (2006.01)
(Continued)

(52) U.S. Cl.
CPC ................ *A01C 17/00* (2013.01); *A01C 1/00* (2013.01); *A01C 1/06* (2013.01); *A01C 7/04* (2013.01);
(Continued)

(58) Field of Classification Search
CPC .. A01C 1/06; A01C 7/06; A01C 17/00; A01C 1/00; A01C 7/16
See application file for complete search history.

(56) References Cited

U.S. PATENT DOCUMENTS

| 722,111 A | 3/1903 | Jones et al. |
| 790,266 A | 5/1905 | Sester et al. |

(Continued)

FOREIGN PATENT DOCUMENTS

| BR | 19979701103 | 12/1998 |
| WO | WO2014161054 | 10/2014 |

OTHER PUBLICATIONS

PCT International Preliminary Report on Patentability, PCT/BR2014/000104, dated May 28, 2014.
(Continued)

*Primary Examiner* — Alicia Torres
(74) *Attorney, Agent, or Firm* — FisherBroyles, LLP

(57) ABSTRACT

A metering and mixing system of solid particulates for a rotary seed dispenser in agricultural equipment for sowing, wherein the rotary seed dispenser is mounted under a seed feeder. The rotary seed dispenser is driven at the bottom by a planter drive system, which provides rotation to a spinning disc provided with a number of calibrated orifices through which the seeds housed in the disc orifices fall on a given point of the agricultural equipment. The metering and mixing system of solid particulates includes a solid particulate feeder that is positioned between the seed feeder and the rotary seed dispenser.

8 Claims, 7 Drawing Sheets

(51) Int. Cl.
  *A01C 7/06* (2006.01)
  *A01C 7/16* (2006.01)
  *A01C 17/00* (2006.01)
  *A01C 7/04* (2006.01)
  *A01C 7/12* (2006.01)

(52) U.S. Cl.
  CPC ............... *A01C 7/06* (2013.01); *A01C 7/128* (2013.01); *A01C 7/16* (2013.01)

(56) References Cited

U.S. PATENT DOCUMENTS

| | | | |
|---|---|---|---|
| 1,330,275 | A | 2/1920 | Osmundson et al. |
| 1,700,738 | A | 2/1929 | Kier et al. |
| 2,304,794 | A | 12/1942 | Bohmker et al. |
| 2,306,748 | A | 12/1942 | Alfred et al. |
| 2,379,724 | A | 7/1945 | Lanham et al. |
| 2,521,565 | A | 9/1950 | Carelock et al. |
| 2,596,898 | A * | 5/1952 | Hoppes ............ A01C 7/06 111/173 |
| 2,656,951 | A | 10/1953 | Murphy et al. |
| 3,246,806 | A | 4/1966 | McBride, Jr. et al. |
| 3,730,395 | A * | 5/1973 | Gallogly ............ A01C 7/081 111/130 |
| 3,848,772 | A * | 11/1974 | Aanestad ............ A01C 1/08 111/34 |
| 4,106,703 | A | 8/1978 | Magda |
| 4,453,866 | A | 6/1984 | Ryan |
| 4,926,768 | A | 5/1990 | Magda |

OTHER PUBLICATIONS

PCT International Search Report, PCT/BR2014/000104, dated May 28, 2014.
PCT International Search Report and Written Opinion, PCT/BR2014/000104, dated May 28, 2014.

* cited by examiner

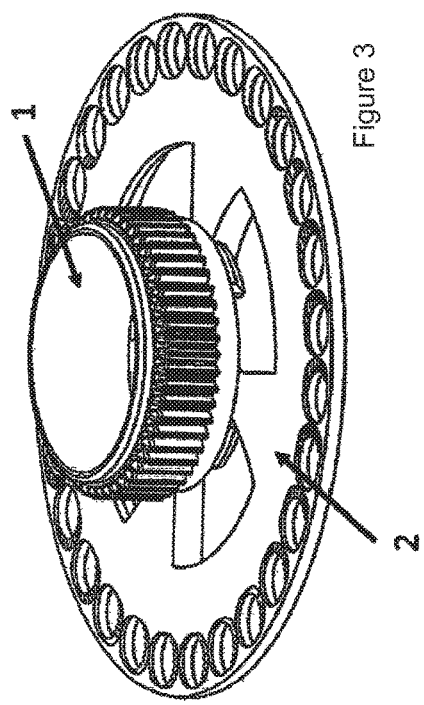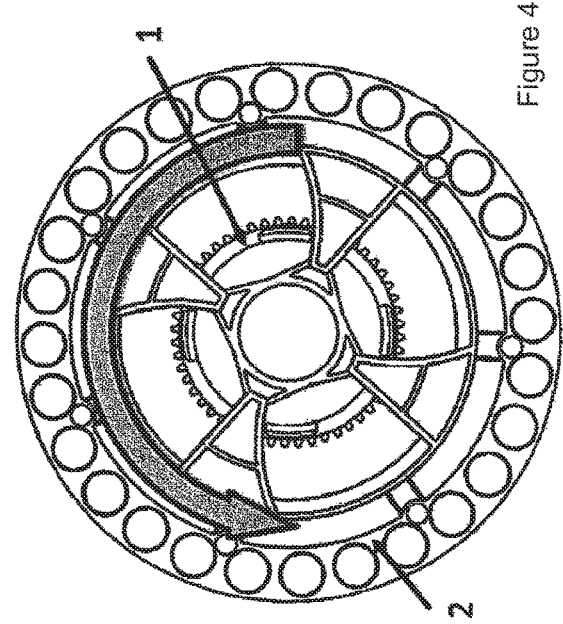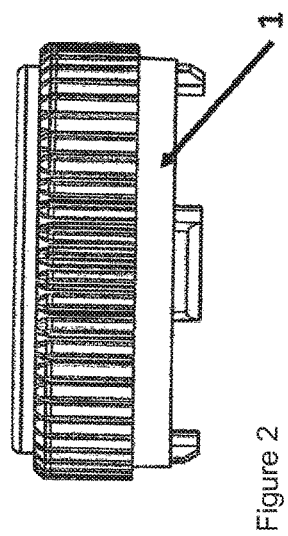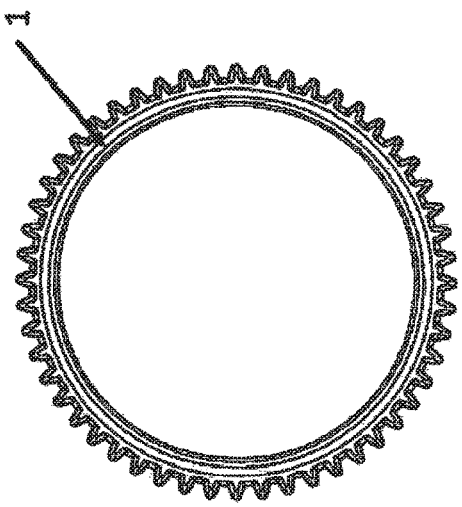

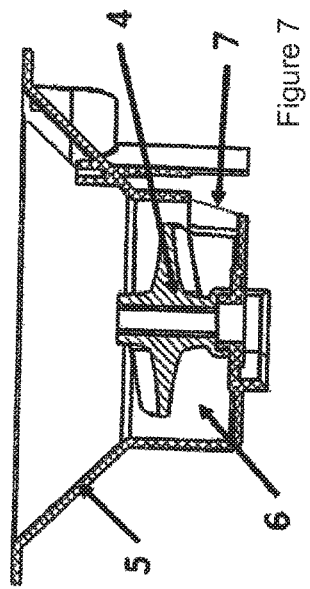
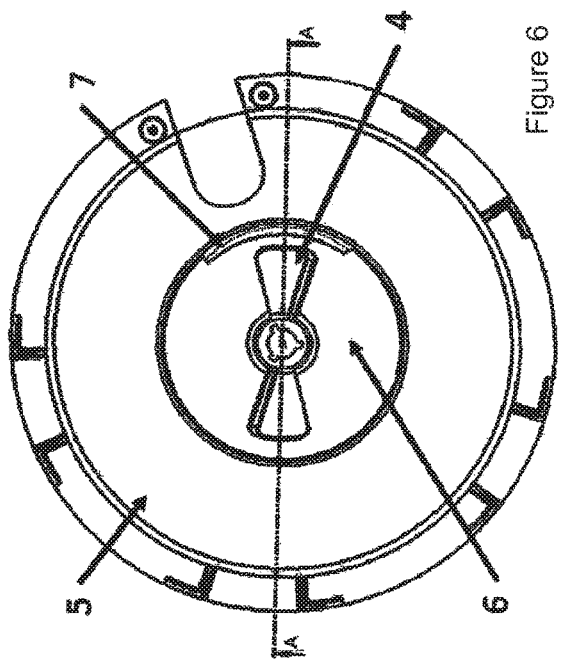
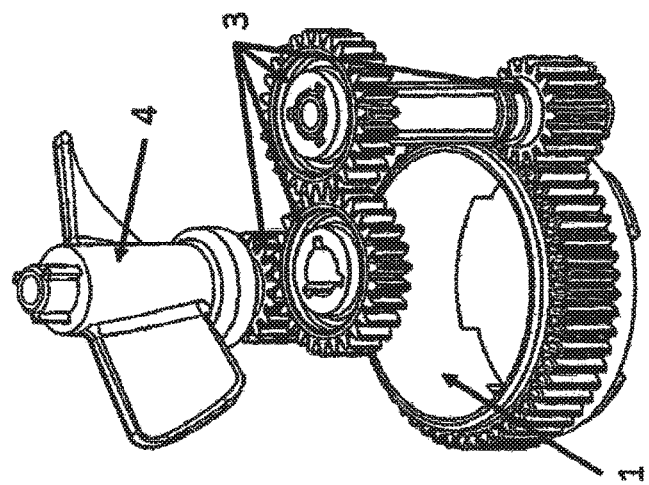

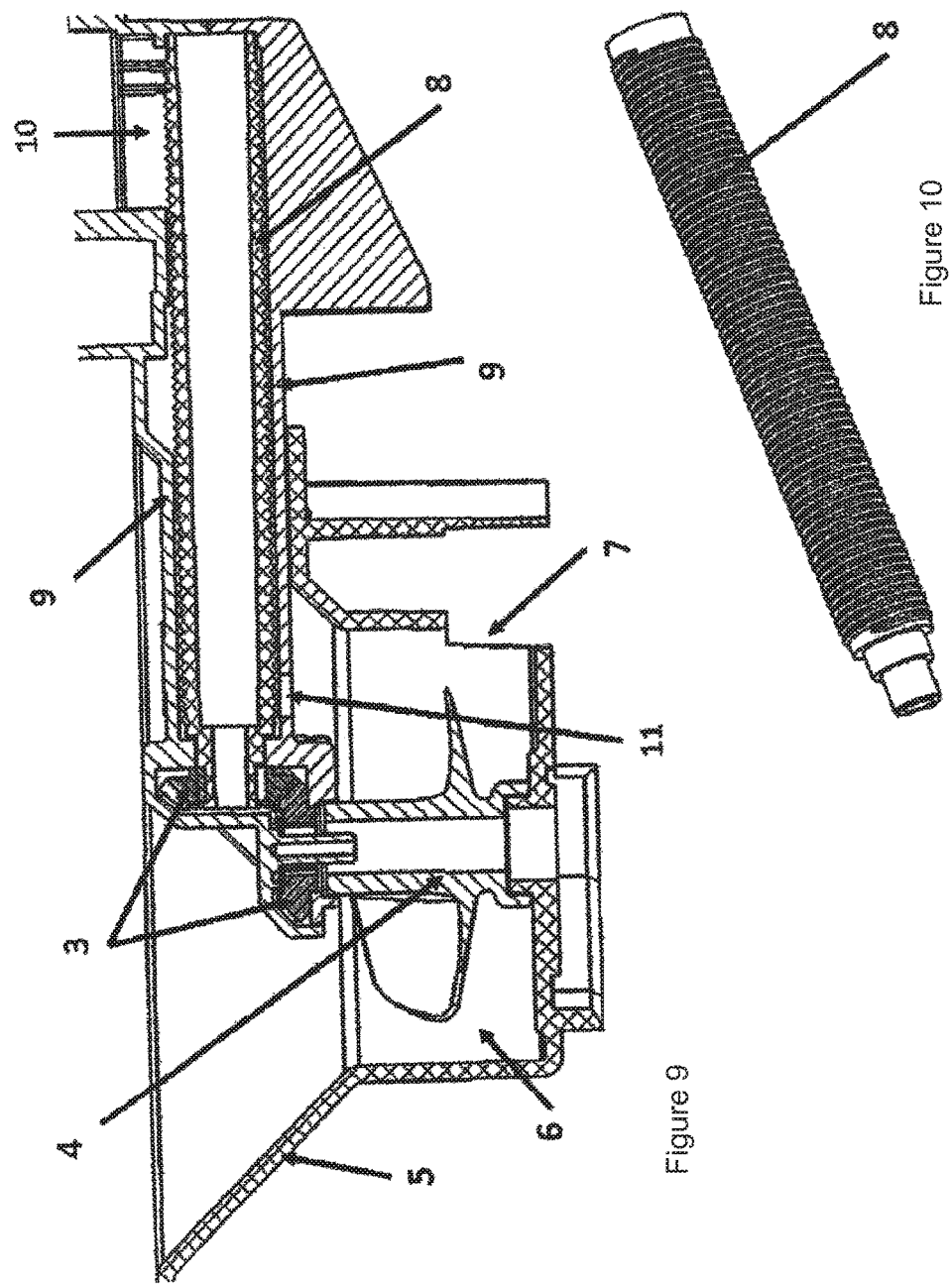

PARTICULATE SOLID METERING AND MIXING SYSTEM FOR ROTARY SEED BROADCASTER USED FOR SOWING IN AGRICULTURAL MACHINES

CROSS-REFERENCE TO RELATED APPLICATION

This application is a continuation of co-pending U.S. patent application Ser. No. 14/781,731, filed Oct. 1, 2015, the disclosure of which is hereby incorporated herein in its entirety by this reference.

TECHNICAL FIELD

The application relates to a metering and mixing system of particulate solids for seed rotary dispensers used in agricultural equipment designed for sowing.

BACKGROUND

As known by those skilled in the art, conventionally, rotary seed dispensers installed in agricultural machines specifically designed for sowing, more commonly known as "planters," usually comprise a tractor used as a driving unit of the sowing equipment, which, while being driven over the soil to be cultivated sequentially performs the following operations:
a) furrows the soil; b) receives an adequate number of seeds at previously established spacing; and c) revolves the soil again to cover the seeds placed in the furrows.

These planters, in general, have a number of mechanisms to carry out the three basic steps described above; one of such mechanisms is the seed rotary dispenser, where the novelty aspect of the present invention lies and which will be defined later.

The seed rotary dispenser is essentially a tubular housing of circular cross-section of small height assembled underneath a small grain-feeding bin. The seed rotary dispenser is driven at the bottom by a miter gear coupled to the planter driving system which provides rotation to a spinning disc with a number of calibrated orifices (holes) and a ring mounted facing the disc and a passage opening through which the seeds, housed in the disc holes, fall at a given point of the device.

Some rotary dispenser models in conventional equipment, which belong to the state of the art, have radial organizer and expelling devices actuated by springs.

A seed rotary dispenser model, which belongs to the state of the art, is described in patent document PI9701103-7, of the same patent holder, filed on Feb. 27, 1997, under the title "Seed Dosing System for Planting Cereals and Leguminous Plants."

Seeds deposited in the bin can receive several different treatments, all externally to the small bin, with liquid products and/or particulate solids for several purposes, mixed in mechanical and/or manual ways, which prepare them for sowing.

BRIEF SUMMARY

The disclosure is directed to improving seed flow standardization during the process of planting, which is carried out by planters. According to one embodiment of the disclosure, there is proposed a metering and mixing system of particulate solids, with the purpose of providing a treatment to the seeds before they are planted, wherein the metering and mixing system is positioned between the grain bin and the rotary dispenser.

Thus, described is a metering and mixing system whose function is to direct the seeds by gravity through the feed cone, which is to be positioned in the bin above, conveying the seeds to a cylindrical mixing compartment at the same time that particulate solids deposited at an input will be metered and conveyed by the rotary motion of a worm gear to the cylindrical mixing compartment; the seeds and the particulate solids will be mixed by a propeller, which may be manufactured with rigid or flexible material, wherein both the worm gear and the propeller have their motion actuated by a gear set that receives, in turn, the movement from a drive gear, which, coupled to the rotating disc with holes is driven by the miter gear, which is driven by the planter transmission system; and, after the mixing, these seeds, now treated, are deposited neatly between the first and second feeding area of the rotary dispenser through the outlet window.

BRIEF DESCRIPTION OF THE DRAWINGS

FIG. 1 presents a plan view of a drive gear that comprises a metering and mixing system;

FIG. 2 presents an elevation view of the drive gear shown in FIG. 1;

FIG. 3 presents a perspective view of the drive gear positioned to detect the movement of the rotary disc with holes;

FIG. 4 presents a bottom view of the driving gear coupled to the rotary disc with holes;

FIG. 5 presents a perspective view of the gear set that transmits the movement to the mixer propeller of the system, the object of the present invention;

FIG. 6 presents a top view of the feed cone of the mixer with the propeller, the outlet window for seeds and the cylindrical mixing compartment of the mixer;

FIG. 7 presents a cross-sectional view of the cone taken according to the section line A-A of FIG. 6, illustrating the relative arrangement of the propeller, the outlet window for seeds and the cylindrical mixing compartment of the mixer;

FIG. 9 presents a cross-sectional view, according to section line B-B of FIG. 8;

FIG. 10 presents a perspective view of the worm gear thread;

DETAILED DESCRIPTION

Figure 8:
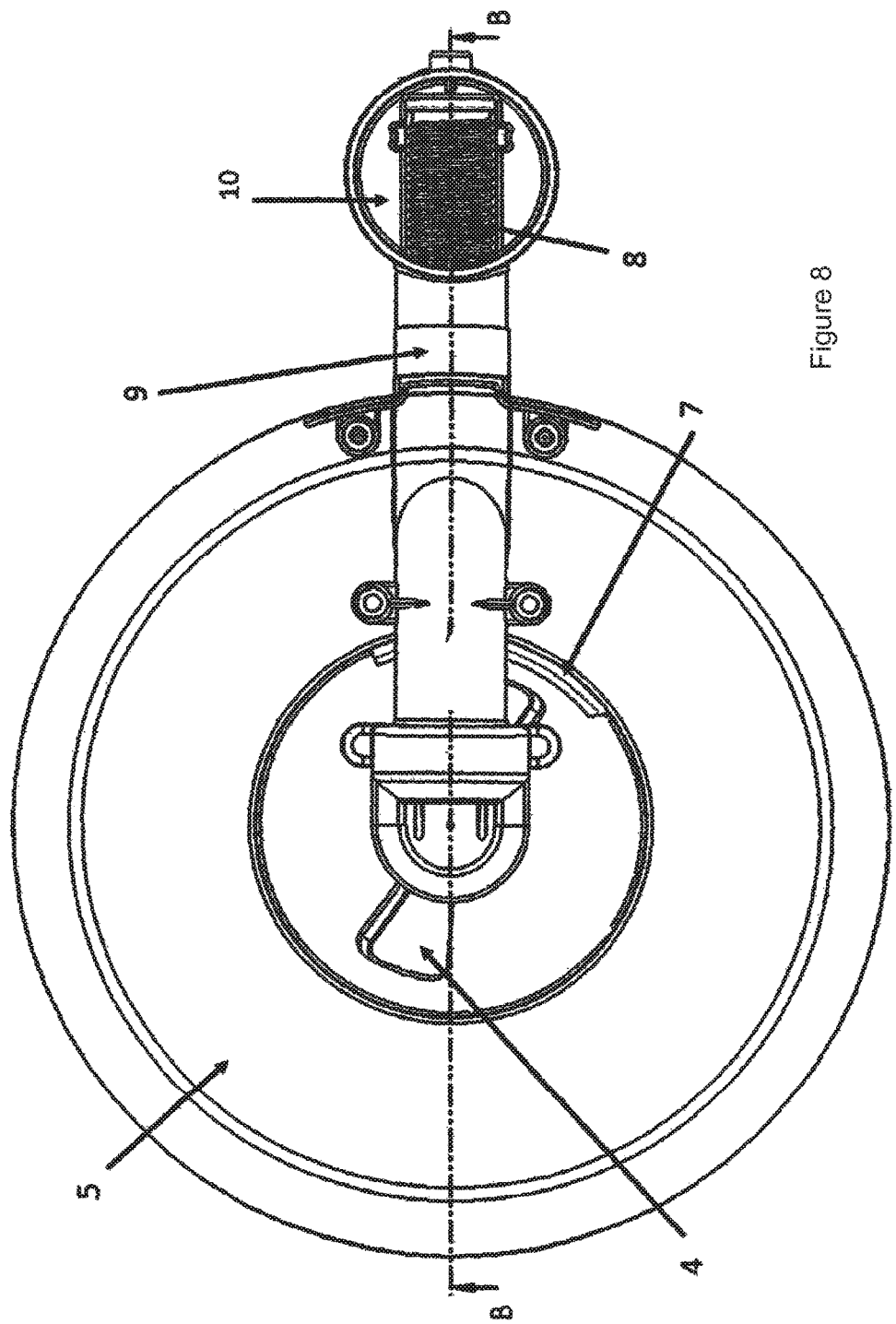
FIG. 8 presents a top view of the mixer feed cone, illustrating the propeller, the body of the metering dispenser, fitted with an opening for feeding the particulate solids, the worm gear thread of the metering dispenser and the outlet window of seeds already treated.

In the following detailed description, reference is made to the accompanying drawings that form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

According to this disclosure, the metering and mixing system of particulate solids for a seed rotary dispenser used in agricultural equipment for sowing is comprised of a feed cone 5 positioned between a seed (grain) bin 20 installed above and a cylindrical mixing compartment 6 positioned below, which may or may not be built into the feed cone 5. Radially to this feed cone 5, a feed body 9 is provided, defined by a tubular part, into which a spindle or worm gear thread 8 is provided, whose function is to convey the particulate solids deposited through an end input 10 of the tubular feed body 9 and through the tubular feed body 9 until the particulate solids reach the cylindrical mixing compartment 6 (see FIGS. 9 and 13) where the seeds will be mixed by a propeller 4, which can be manufactured with rigid or flexible material. Both the worm gear thread 8 and the propeller 4 have their movement transmitted through a gear set 3 (see FIGS. 5 and 9), which, in turn, receives the movement from a driving gear 1, mounted coaxially and internally to a rotary seed dispenser container 21 (see FIG. 13). This driving gear 1 (see FIGS. 3 and 4) is axially coupled to the rotating disc with holes 2 and is driven by the miter gear, which, in turn, is driven by the planter transmission system (not illustrated). After being mixed, the seeds are deposited neatly between the first supply area 12 and the second supply area 13 of the rotary seed dispenser container 21 through an outlet window 7 of the cylindrical mixing compartment 6 (see FIGS. 7 and 13).

Figure 13:
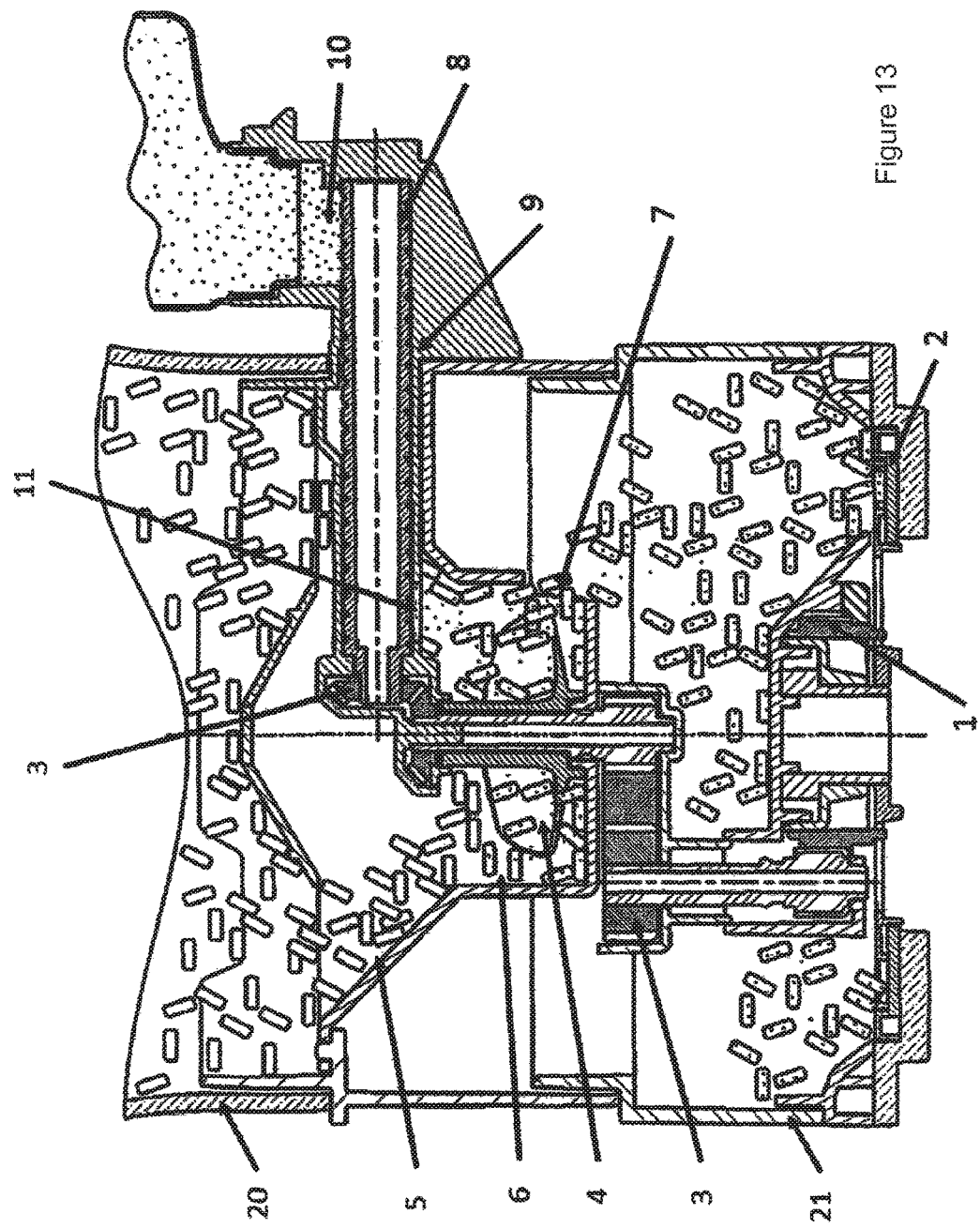
FIG. 13 presents a cross-sectional elevation view of the metering and mixing system, the object of the present invention, illustrating the metering operation and treatment of seeds before they are released into a sowing line.

As can be seen in FIGS. 9 and 13, the respective gear set 3 causes the worm gear thread 8 to rotate in order to meter and convey the preset amount of solid particles along the body of the metering device 9, between a feeding area 10 of the particulate solids 11 and the outlet window 7 of particulate solids 11, where the particulate solids 11 fall into the cylindrical mixing compartment 6. The propeller 4, which rotates inside such cylindrical mixing compartment 6, is responsible for mixing the seeds, which come from the seed bin 20, with the particulate solids 11 introduced into the cylindrical mixing compartment 6, as mentioned above.

Figure 11:
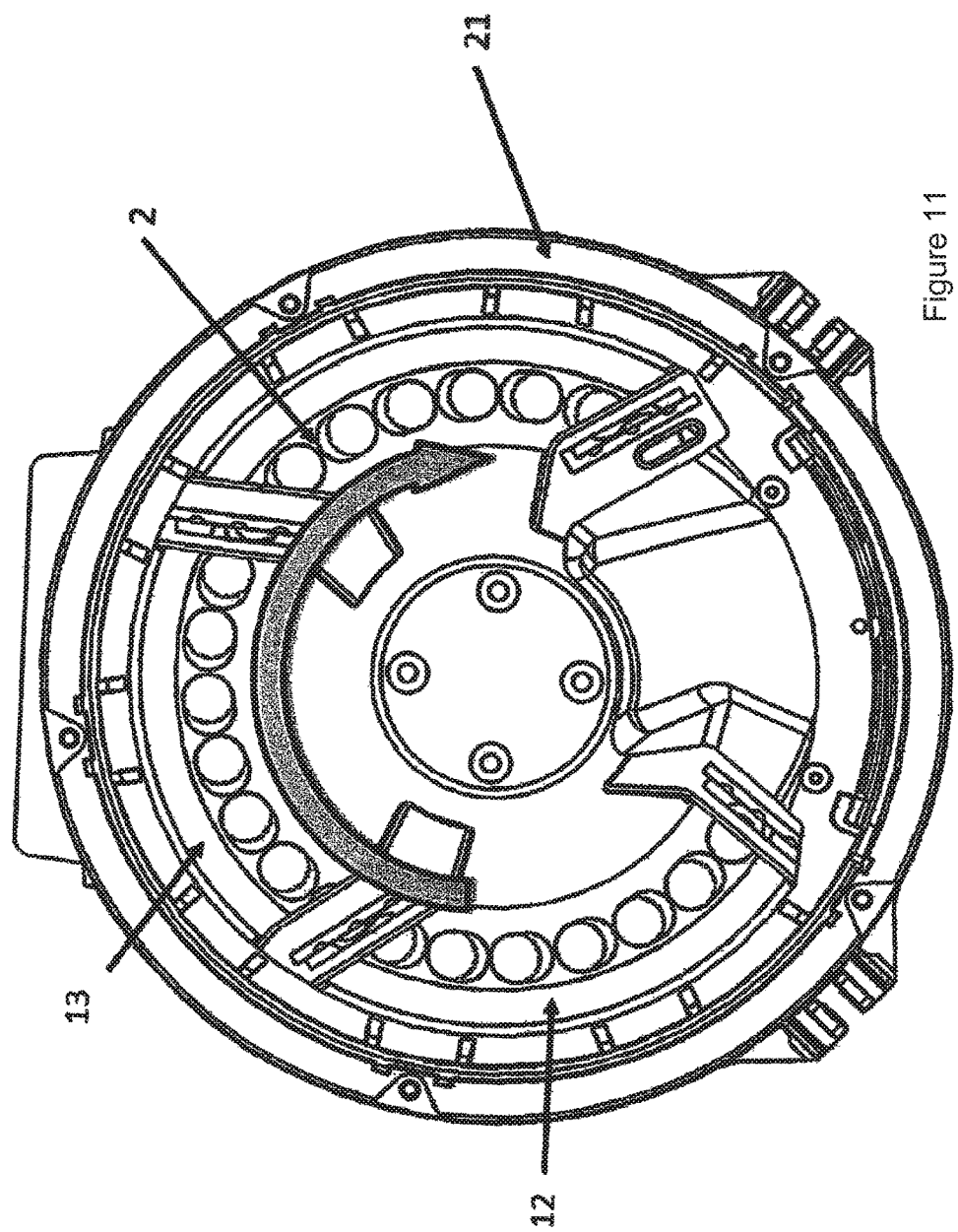
FIG. 11 presents a top view of a conventional seed rotary dispenser.
Figure 12:
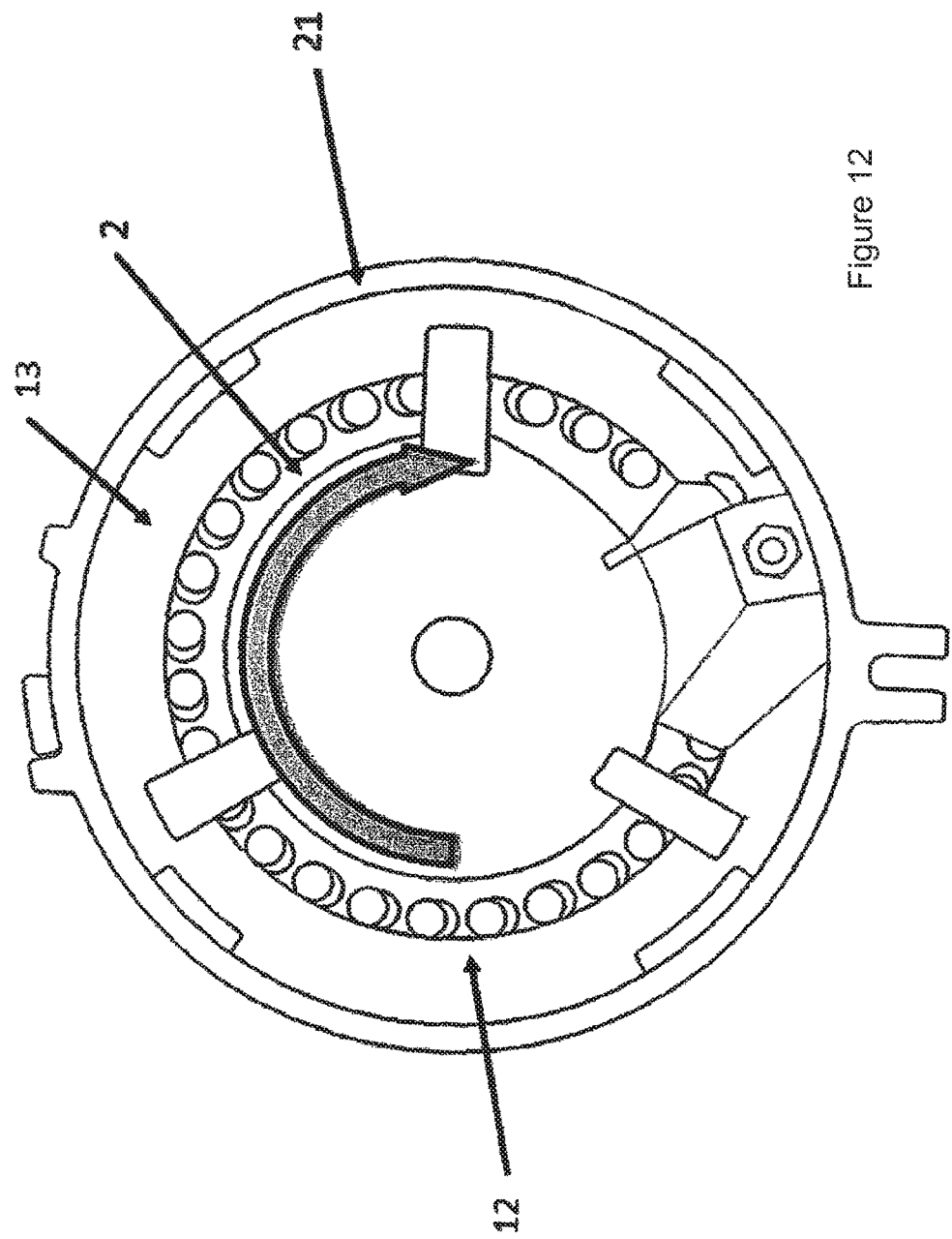
FIG. 12 presents a top view of the seed rotary dispenser in conventional equipment, which has a radial organizer, and seed expelling devices, actuated by springs.

With such configuration provided by the present disclosure, the assembly of the solid mixer set relative to the rotating dispenser, according to FIGS. 11, 12 and 13, allows the seeds to be already mixed or superficially impregnated with the solid particles when passing through the last organizer.

Despite a preferable embodiment of the metering and mixing system of particulate solids and seeds being assembled in a seed metering dispenser as described and illustrated herein, it is important to mention that such construction herein defined for its components may and will foreseeably be used in a separate way in other dispensers, and such applications may use different mounting and retaining means such as bolts, clips, and other fittings, among other types of fasteners.

What is claimed is:

1. A metering and mixing system of solid particulates for a seed meter in an agricultural equipment for sowing, the metering and mixing system of solid particulates comprising:
- a seed feeder;
- a seed meter comprising a rotary disc with holes;
- a feed receiver mounted under the seed feeder and comprising:
  - a mixing compartment;
  - a feeder of solid particulates in fluid communication with the mixing compartment, the mixing compartment comprising a propeller for mixing together the seeds and the solid particulates received simultaneously in the mixing compartment to provide treated seeds to the seed meter; and
  - an outlet window that leads the treated seeds to the seed meter,
- wherein the mixing compartment including the propeller is positioned between the seed feeder and the seed meter.

2. The system of claim 1, wherein the feed receiver comprises a feed cone over the mixing compartment, and the feed cone and a mixing compartment body are formed integrally, as a single piece.

3. The system of claim 1, wherein the feed receiver comprises a feed cone over and coupled to the mixing compartment.

4. The system of claim 1, wherein the feeder of solid particulates comprises a tubular part in which a screw or worm gear thread is provided, the screw or worm gear thread configured to convey solid particulates from an inlet of the tubular body through the tubular body to an outlet of the tubular body and into the mixing compartment.

5. A metering and mixing system for metering solid particulates and mixing the metered solid particulates with seeds, the metering and mixing system comprising:
- a seed feeder;
- a feeder of solid particulates;
- feed receiver comprising a mixing compartment, the mixing compartment comprising a propeller, wherein the feed receiver is configured to receive seeds from the seed feeder and to receive metered solid particulates from the feeder of solid particulates in the mixing compartment to be mixed together by the propeller to treat the seeds with the solid particulates; and
- a rotary disc with holes positioned to receive treated seeds from the feed receiver.

6. The system of claim 5, wherein the mixing compartment is configured to convey the treated seeds through an outlet window to the rotary disc with holes.

7. The system of claim 5, wherein the feeder of solid particulates comprises a feeding body including an inlet aperture, an outlet aperture, and metering means provided inside the feeding body.

8. The system of claim 7, wherein the metering means comprises a screw or worm gear thread.

* * * * *